United States Patent [19]

Grantham et al.

[11] 3,857,920

[45] Dec. 31, 1974

[54] RECOVERY OF LITHIUM CARBONATE

[75] Inventors: Le Roy F. Grantham, Calabasas; Samuel J. Yosim, Woodland Hills, both of Calif.

[73] Assignee: The United States of America as represented by the Secretary of Department of Health, Education and Welfare, Washington, D.C.

[22] Filed: July 29, 1971

[21] Appl. No.: 167,337

[52] U.S. Cl................. 423/208, 423/209, 423/427, 423/210.5
[51] Int. Cl. ........................ C01d 11/02, C01d 7/22
[58] Field of Search ......... 23/63; 423/208, 209, 427

[56] References Cited
UNITED STATES PATENTS
| | | | |
|---|---|---|---|
| 3,037,844 | 6/1962 | Giammarco | 23/150 |
| 3,343,910 | 9/1967 | Archambault et al. | 23/63 X |
| 3,438,727 | 4/1969 | Heredy | 423/210.5 X |

OTHER PUBLICATIONS
Lauer et al., "Chemical Engineering Techniques," 1952, pages 345–346.

Primary Examiner—M. Weissman
Attorney, Agent, or Firm—L. Lee Humphries; Henry Kolin

[57] ABSTRACT

Lithium carbonate is recovered from an aqueous slurry by first treating the sparingly soluble lithium carbonate with carbon dioxide to convert it to the much more soluble lithium bicarbonate. The bicarbonate solution is next separated from insoluble material present and then decarbonated to precipitate lithium carbonate, which is then recovered. The present process is of particular utility for the recovery of lithium carbonate from fly ash- and coke-containing filter cakes resulting from a process for the treatment of flue gas to remove sulfur dioxide present therein by absorption of the sulfur dioxide in a molten alkali metal carbonate mixture.

3 Claims, 1 Drawing Figure 3,857,920
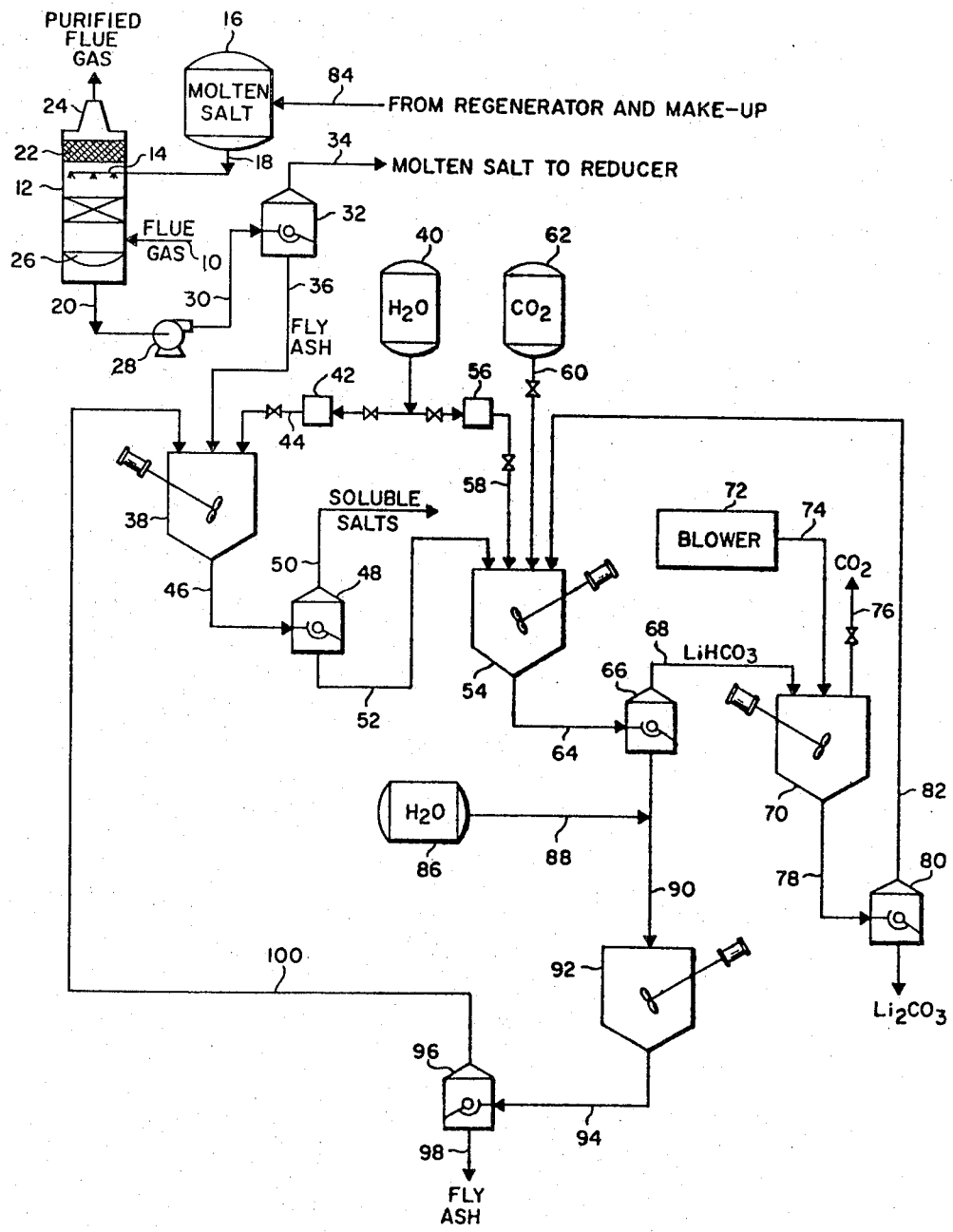

RECOVERY OF LITHIUM CARBONATE

The invention described herein was made in the course of, or under, a contract with the Department of Health, Education, and Welfare.

BACKGROUND OF THE INVENTION

This invention relates to a process for the recovery of lithium carbonate from aqueous slurries. It more particularly relates to a process for the recovery of lithium carbonate in admixture with fly ash and/or coke in filter cakes.

The molten carbonate process for the removal of sulfur oxides from power-plant flue gases is of particular commercial interest and is shown in U.S. Pat. Nos. 3,438,722, 3,438,727, and 3,438,734. In its preferred aspects, the process broadly consists of scrubbing the sulfur oxide-containing flue gas with a molten mixture of the carbonates of lithium, potassium, and sodium at a minimum temperature of about 400°C. The resultant melt, containing up to 40% alkali metal sulfite salts, is regenerated by heating it to about 800°C, at which temperature the sulfites, as well as sulfates formed by disproportionation of the sulfites, can be reduced to sulfides by treatment with carbon. The alkali-metal sulfides in the melt are converted back to carbonates with the concurrent formation of hydrogen sulfide by reaction of the sulfides at about 450°–500°C with carbon dioxide and steam.

For typical power-plant operating conditions, burning a coal containing about 3% sulfur and 10% ash, the resultant flue gas will contain about 0.2 vol.% sulfur oxides and from about 80 to 100% of the initially present coal ash in the form of finely divided fly ash. The presence of the fly ash in the flue gas raises several technological and economic problems in the removal of the sulfur oxides. The large amounts of fly ash produced by coal-fired boilers will be carried along with the flue gases into the molten carbonate scrubber unless removed prior to desulfurization of the flue gas. Fly ash entering the scrubber will be readily picked up by the molten carbonate and incorporated into the process melt. Fly ash accumulating in the melt would soon result in the melt becoming a thick slurry or paste which could not be circulated through the process equipment. Therefore the fly ash must be prevented from accumulating in the melt either by removing it from the flue gas stream before it enters the molten carbonate scrubber, or by continuously removing it from the melt, or by a combination of both of these processes. Economic considerations will ultimately determine the proper technique or combination of techniques to be used. In general, it is considered most economical to initially remove at least 95% of the fly ash present in the flue gas stream by use of a series of electrostatic precipitators prior to contacting the flue gas with the molten carbonate in the initial scrubbing step. Further initial removal of the fly ash is considered technically feasible. However, even with 99.9% prior removal of the fly ash, there is still a continuous build-up of fly ash in the melt which requires filtration of the melt.

The bulk density of fly ash is approximately half that of its true density. Thus the spaces between fly ash particles in a filter cake will be filled with molten carbonate. Therefore, approximately one pound of the melt will be absorbed and held in the fly ash filter cake for each pound of fly ash present. The molten carbonate melt preferably consists of approximately equal amounts by weight of the carbonates of sodium, potassium, and lithium. However, the cost ratio of these respective constituents of the mixed carbonate melt is about 1:4:25. Thus recovery of the more expensive lithium carbonate from admixture with the fly ash in the filter cake becomes an important factor in carbonate melt replacement costs, which can be considerable at other than very high fly ash precipitator efficiencies.

Furthermore, in the reduction step of the molten carbonate process, excess unreacted reducing agent, generally a fluidized coke, and coke ash must be filtered out of the reduced melt. This coke and coke ash filter cake also is porous and contains about 50 wt.% of carbonate. This introduces a further carbonate replacement cost if no recovery of carbonate is attempted.

In attempting to recover the carbonate melt, particularly the lithium carbonate, from the fly ash and coke filter cakes, it has been found that water washing of the fly ash-and coke-containing filter cakes will ordinarily be sufficient to remove the less expensive sodium and potassium carbonates because of their high solubility in water. However, because of the relatively low solubility of lithium carbonate in water, about 1 gm/100 ml water, water washing alone is unsuitable for recovery of the lithium carbonate present in the fly ash and coke filter cakes. In attempting to solubilize the relatively insoluble lithium carbonate, an aqueous slurry of the lithium carbonate may be treated with lime to form lithium hydroxide and calcium carbonate. However, the rate of conversion of lithium carbonate to the more soluble lithium hydroxide proceeds slowly because of the limited solubility of the lime. Lithium carbonate may also be solubilized by treatment with hydrogen sulfide. The bicarbonate and hydrosulfide of lithium are formed, both of these products being soluble in water and thus separable from the fly ash by filtration. However, such a process requires not only conversion of the bicarbonate back to the carbonate, which is a feature of the present process, but also further recovery of the hydrosulfide by an alternate recovery method, or else by concentration of the hydrosulfide by evaporation. Thus additional processing steps are required.

The need thus exists for a simple economic method for recovering lithium carbonate from fly ash and coke filter cakes for process reuse in order to achieve a satisfactory economic balance which would make the molten carbonate process of enhanced economic interest. The more efficient the process for the recovery of lithium carbonate from the fly ash and coke filter cakes, the more economical becomes the process with respect to the requirements for the total removal of fly ash, including removal by a combination of prior electrostatic precipitation and subsequent filtration of the melt.

SUMMARY OF THE INVENTION

Accordingly, it is an object of the present invention to provide a highly efficient method for the recovery of lithium carbonate in high yields from aqueous dispersions, suspensions, and slurries, particularly slurries resulting from the dispersion in water of fly ash and/or coke filter cakes containing lithium carbonate admixed therewith, using inexpensive readily available materials and avoiding the use of expensive equipment.

In accordance with the broad aspects of this invention, a lithium carbonate slurry, generally also containing dispersed finely divided water-insoluble particulate matter such as fly ash or coke, is treated with carbon dioxide to convert the lithium carbonate to the more water-soluble lithium bicarbonate. The resulting bicarbonate solution is then filtered to remove the insoluble material present. The aqueous lithium bicarbonate solution is next decarbonated either by vacuum treatment, heat, or preferably by aeration of the solution, or a combination of these techniques, to precipitate lithium carbonate in the aqueous medium, carbon dioxide also being evolved. Preferably both the filtrate, which contains some unreacted lithium bicarbonate, and the evolved carbon dioxide are recycled for reuse in the dissolution and carbonation steps. The precipitated lithium carbonate is recovered by filtration and reused as part of the molten carbonate inventory. Thereby essentially complete recovery of the lithium carbonate from the fly ash and coke filter cakes can be achieved. Based on process economics, about 80 to 90% is preferably recovered. The lithium carbonate may be present in the fly ash filter cake in amounts up to about 20 wt.% and in the coke filter cake in amounts up to about 15 wt.%.

In its preferred aspects, the present process for the recovery of lithium carbonate from aqueous slurries is practiced in conjunction with the molten carbonate process for the removal of sulfur oxides from powerplant flue gases by absorption of the sulfur oxides in a mixture of alkali metal carbonates. The carbonate-containing fly ash filter cake obtained by filtration of the sulfite-containing melt from the absorption step has a composition of about 60 wt.% melt. Similarly, the coke filter cake obtained following the reduction step contains about 50 wt.% melt. The hot fly ash and coke filter cakes may be separately treated, but preferably are combined for recovery of the lithium carbonate therefrom. The hot filter cake at a temperature of about 425°C is slurried with about two parts of hot water per part of filter cake in a suitable vessel. Using wash water at about 30°C, a final temperature of about 90°C is reached. After thorough stirring, the mixture is filtered, and the filter cake is discharged to a second vessel. This initial slurrying step dissolves from 95 to 100% of the sodium and potassium carbonates, and also some soluble chlorides, sulfates, and water-soluble trace impurities, as well as a small amount of lithium salts. The filtrate from the filtering step is discharged to a pond for disposal or for recovery after evaporation of the water.

The lithium carbonate-containing filter cake discharged into the second vessel is then slurried with about 2 to 10 parts of water under an atmosphere containing carbon dioxide, preferably at below room temperature, close to 0°C, and preferably at a pressure between 10 and 30 psig $CO_2$, thereby transforming the insoluble lithium carbonate to the more soluble lithium bicarbonate. Flue gas, which ordinarily contains about 10–15 vol.% $CO_2$, may be directly used in the carbonation step. Complete carbonation may be achieved in from 10 to 60 minutes depending on the temperature and carbon dioxide pressure. In general, lower temperatures and higher $CO_2$ partial pressures favor more complete conversion to the bicarbonate. After further stirring, the resultant mixture is filtered to separate the filtrate containing the soluble lithium bicarbonate and the filter cake containing the fly ash and/or coke. The lithium bicarbonate solution is next decarbonated at room temperature so as to strip the carbon dioxide from the solution, the lithium carbonate thereby precipitating in the decarbonation tank. Where flue gas is used in the carbonation step, recovery of $CO_2$ is undesirable and decarbonation is accomplished without attempted recovery of the evolved $CO_2$. Thus decarbonation is most readily accomplished by blowing air through the aqueous mixture in the decarbonation vessel. Where recovery of $CO_2$ is desired, it is preferable to first place the aqueous medium under vacuum and thereby recover most of the evolved $CO_2$. Aeration may then be used for completion of the decarbonation reaction. Following decarbonation, which ordinarily is completed in from 10 to 60 minutes, the aqueous medium is filtered to recover the precipitated lithium carbonate. Both the filtrate containing some unreacted lithium bicarbonate and the separately recovered lithium carbonate are recycled for reuse in the process. At least 85% of the lithium carbonate can thereby be readily recovered, which represents approximately 70% of the mixed alkali metal carbonate make-up costs.

BRIEF DESCRIPTION OF THE DRAWING

The sole FIGURE of the drawing shows a schematic flow diagram of a preferred embodiment of the invention illustrating the conversion of a lithium carbonate slurry to a lithium bicarbonate solution by carbonation of this slurry, followed by decarbonation of the separately recovered lithium bicarbonate solution to precipitate lithium carbonate in the aqueous medium. The lithium carbonate is then recovered for reuse in the process.

DESCRIPTION OF THE PREFERRED EMBODIMENTS

In the broadest aspects of this invention, any aqueous dispersion, suspension, or slurry of lithium carbonate may be treated with carbon dioxide to convert the relatively insoluble lithium carbonate to the soluble lithium bicarbonate, followed by decarbonation of the aqueous lithium bicarbonate solution to pricipitate lithium carbonate, which is then recovered. However, because of the present requirements for an effective, economical process for the elimination of air pollution caused by the emission of sulfur oxides into the atmosphere, the present invention will be particularly illustrated with respect to the removal of sulfur oxides from hot combustion gases obtained by the burning of sulfur-containing fossil fuels, particularly in electric generating plants. In these plants, the combustion of a ton of an average coal containing about 3% sulfur and 10% ash typically yields about 400,000 standard cu. ft. of stack gases that contain 2,000 ppm sulfur dioxide and 30 ppm sulfur trioxide by volume, i.e., less than 0.5 vol.%, and from about 80 to 100% by weight of the initially present ash in the coal in the form of finely divided fly ash. The molten carbonate process described in the afore-mentioned patents is directed to the removal of the small sulfur dioxide content compared with the large flue gas volume, before discharge of the flue gas into the atmosphere, while regeneratively recovering the alkali metal carbonate absorbent. The present process represents an improvement in the molten carbonate process with respect to the recovery of otherwise expended lithium carbonate from the fly ash and coke filter cakes. It will be particularly described with respect to the treatment of fly ash filter cake in representative coal-burning electric power plants which generate 800 or 1,000 Mw of electric power. However, coke filter cake containing absorbed melt is processed in essentially the same manner, either separately or together with the fly ash filter cake.

Referring now to the drawing, a flue gas obtained from the combustion of a sulfur-containing coal at a temperature of about 425° ± 25°C is admitted by way of a conduit 10 to an absorber unit 12. For a typical 1,000 Mw coal-fired electric utility plant utilizing coal containing 3 wt.% sulfur and 10% ash, about 4,650,000 cu ft./per min. flue gas with an $SO_2$ content of about 0.18 vol.% is generated. The flue gas is passed through a series of electrostatic fly ash precipitors (not shown) to remove at least 95% and preferably about 99% of the fine fly ash particles entrained therein, prior to entry of the flue gas into the absorber. For 800-1,000 Mw plants, absorber unit 12 ordinarily consists of five stainless steel spray towers in parallel arrangement. These towers are suitably insulated with about 5 inches of high-temperature insulation so that the temperature drop within them is less than five degrees centigrade.

The flue gas enters at the base of absorber 12 and travels upwardly with a velocity of about 20 ft./sec. It is contacted countercurrently by a spray of alkali metal molten carbonate (M.P. about 400°C) which is discharged through a spray distributor 14 located about 15 ft. above the base of the tower. The molten carbonate salt, which preferably is a ternary salt mixture of approximately eutectic composition of the carbonates of lithium, sodium, and potassium, is contained in a storage vessel 16, which is suitably insulated and equipped with heaters so as to maintain the carbonate salt in a molten state. The molten salt leaves vessel 16 by way of a conduit 18 connected to spray distributor 14 at a flow rate adjusted to provide about 10-30 mole % sulfite content in the effluent molten salt stream leaving the bottom of absorber 12 by way of a conduit 20. The basic molten carbonate process for the removal of sulfur oxides from a flue gas, is essentially that shown in U.S. Pat. No. 3,438,727, particularly the embodiment shown in FIG. 2 thereof, which shows the sequential steps of absorption, reduction, and reformation. The process of the present invention is particularly directed to an improvement in the patented process with respect to the recovery of absorbed molten salt from the fly ash filter cake downstream from the absorption stage and from the coke filter cake downstream from the reduction stage of the patented process.

Referring again to the drawing, after the flue gas has been desulfurized following contact with the molten carbonate spray, it flows past distributor 14 into a mist eliminator 22, which serves to remove entrained salt-containing droplets from the flue gas. The desulfurized flue gas is then passed through a conical transition section 24 from whence, after suitable cooling, it is ultimately discharged to the atmosphere.

The molten sulfite-containing carbonate melt resulting from the rapid reaction between the molten carbonate spray and the sulfur oxides in the flue gas is collected in a dishedbottom heated sump 26 of absorber 12. About a 70 mole % excess of unreacted carbonate is maintained to serve as a solvent for the sulfite, and some sulfate, formed by the reaction. The sulfite-carbonate mixture is pumped from sump 26 of absorber 12 through conduit 20 by way of a pump 28 and a conduit 30 to a filter 32.

In this filtration step, the fly ash entrained in the flue gas and removed with the sulfite-containing melt is separated therefrom. The molten salt filtrate is fed by way of a conduit 34 to the reduction step of the molten carbonate process where alkali metal sulfite and sulfate are reduced to sulfide. Coke is preferably used in the reduction step, and the molten carbonate melt containing the dissolved sulfide also contains entrained coke particles. Filtration of this melt prior to further processing results in recovery of a coke filter cake containing absorbed melt. This coke filter cake may be separately processed for recovery of the melt, or may be combined with the fly ash filter cake for a single recovery operation. Thus the described process for the recovery of lithium carbonate from the fly ash filter cake is similarly applicable to the recovery of lithium carbonate from the coke filter cake.

Filter 32 is selected to preferably give a "dry cake" discharge, the term "dry cake" referring to the filter cake containing solids plus associated wetting liquid. Where a filter unit is used which does not provide a dry cake discharge, the entire contents of the filter require discharge at the end of each cycle. With such a type filter, an elaborate melt recovery system would be required because of the substantial amount of melt discharged for each cycle. However, because of the porosity of fly ash and coke filter cakes, even a "dry cake" discharge carries measurable quantities of melt. Thus a fly ash dry cake contains about 50 to 65 wt.% melt, and a coke dry cake contains about 40 to 50 wt.% melt. Thus a representative "dry" fly ash filter cake contains about 40% ash, 40% carbonate, and 20% sulfite and/or sulfate, by weight.

The fly ash cake from filter 32 at a temperature of about 425°C is discharged by way of a conduit 36 into a hopper or stirred vessel 38. Steam may be used to aid in sluicing the filter cake into vessel 38. At the same time water from a storage tank 40 is warmed to a temperature of about 30°C by passage through a heater or heat exchange unit 42, and then fed to vessel 38 by way of a valved conduit 44. The stirred slurry in vessel 38 contains about two parts of water per part of filter cake and is brought to a temperature of about 90°C. For an 800 Mw power plant using a typical pulverized coal fuel and electrostatic precipitators providing 99% prior removal of resultant fly ash, about 2,800 lbs. of filter cake containing 60 wt.% melt would be collected in a 2-hour period. Thus filter 32 ordinarily consists of two filters each having a capacity of about 21.5 cu. ft. These would be employed with automatic switch-over operation, each filter being capable of a nominal 2-hour operating load.

After thorough stirring of the slurry mixture in vessel 38, it is discharged by way of a conduit 46 to a filter 48. The filtrate from filter 48 is passed therefrom by way of conduit 50 and is discharged to a pond for disposal or for subsequent recovery after evaporation of water. This filtrate contains the soluble sodium and potassium salts, principally as carbonates, as well as a small amount of lithium salts, and any water-soluble trace impurities initially picked up in treatment of the flue gas.

The filter cake from filter 48 is discharged by way of a conduit 52 to a second hopper or stirred wash vessel 54. Water from tank 40 is cooled by passage through a cooler or heat exchanger 56 and is then fed to vessel 54 by way of a valved conduit 58. About 2 to 10 parts of water for each part of slurry is preferably used in vessel 54. The temperature of the aqueous solution in vessel 54 is maintained between −10° and 100°C., preferably between 0° and 10°C, and carbon dioxide at a pressure of about 20 psig is bubbled into vessel 54 by way of a valved conduit 60 from a carbon dioxide source 62 while maintaining vigorous stirring. Essentially the following reaction occures in vessel 54:

$$Li_2CO_3(s) + CO_2(g) + H_2O(l) \rightarrow 2LiHCO_3(aq)$$

where $s$, $g$, $l$, and $aq$ refer to the solid, gas, liquid, and aqueous phases, respectively.

After the reaction in vessel 54 is complete, the mixture is discharged by way of a conduit 64 to a filter 66. The lithium bicarbonate solution is removed as a filtrate by way of a conduit 68 to an aerator or decarbonation vessel 70. The lithium carbonate is recovered from the bicarbonate solution in vessel 70 by decarbonating the solution. This is readily accomplished by bubbling air through the solution from a blower 72 by way of a conduit 74. The evolved carbon dioxide which is stripped from the solution is removed by way of a valved conduit 76, generally for reuse in the process. For example, it may be returned to carbon dioxide storage tank 62. Essentially the following exemplary reaction occurs in vessel 70:

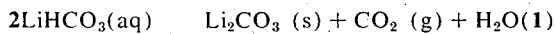

The resultant aqueous slurry is discharged by way of a conduit 78 to a filter 80. Lithium carbonate in relatively pure form is recovered as a precipitate from filter 80. The filtrate from filter 80 contains some dissolved lithium bicarbonate and lithium carbonate and is returned by way of a conduit 82 to vessel 54 for reuse in the process. The precipitated lithium carbonate recovered from filter 80 is reused in the process, and may be conveniently returned to storage vessel 16 by way of a conduit 84.

The precipitated ash filter cake recovered from filter 66 contains some of the aqueous lithium bicarbonate solution. It is slurried with water from a storage vessel 86 by way of a conduit 88, and the slurry is fed by way of a conduit 90 to a stirred wash vessel 92. The contents of vessel 92 are then discharged by way of a conduit 94 to a filter 96. The precipitated, washed fly ash is removed by way of a conduit 98 for disposal, the filtrate being returned for reuse in the process by way of a conduit 100 to vessel 38.

The following examples illustrate various aspects of the practice of the present invention but are not intended to unduly limit its generally broad scope.

EXAMPLE 1

Conversion of Lithium Carbonate to Lithium Bicarbonate

A weighed amount of lithium carbonate was slurried in water at 0°C under specified $CO_2$ pressures for 15–30 minutes. The undissolved lithium carbonate was filtered, dried, and weighed. As shown in Table 1 below, about 95% of the lithium carbonate initially present was dissolved.

TABLE 1

Aqueous Dissolution of $Li_2CO_3$ as $LiHCO_3$ under $CO_2$ Pressure at 0°C

| Run No. | Initial $Li_2CO_3$ (gm) | $CO_2$ (psig) | $H_2O$ (ml) | Time (min) | Undissolved $Li_2CO_3$ (gm) | Dissolved (%) |
|---|---|---|---|---|---|---|
| 1 | 5.0 | 15 | 100 | 20 | 0 | 100 |
| 2 | 7.0 | 20 | 100 | 30 | 0.5 | 93 |
| 3 | 7.0 | 20 | 100 | 30 | 0.1 | 98 |
| 4 | 6.5 | 20 | 100 | 15 | 0.2 | 97 |

EXAMPLE 2

Recovery of Lithium Carbonate from Lithium Bicarbonate

The filtrate from Example 1 was aerated or evacuated to remove the $CO_2$ from solution and to precipitate the $Li_2CO_3$. The mixture was then filtered, and the precipitate was dried and weighed. The amount of lithium carbonate recovered and the percent of the dissolved lithium carbonate recovered (50–75%) are given in Table 2.

TABLE 2

Precipitation of $Li_2CO_3$ from an Aqueous Solution of $LiHCO_3$ by Removing Dissolved $CO_2$

| Run No. | $Li_2CO_3$ Present(gm) | $Li_2CO_3$ Recovered(gm) | % | Decarbonation Conditions |
|---|---|---|---|---|
| 1 | 5.0 | — | — | — |
| 2 | 6.5 | 3.6 | 55 | Air, 90 min |
| 3 | 6.9 | 3.9 | 57 | Air, 90 min |
| 4 | 6.3 | 0.3 | 5 | Vac. 60 min |
|   |     | 4.7 | 75 | Air, 30 min |

As may be noted from Table 2, about 50–75% of the lithium carbonate can be recovered from the solution simply by removing $CO_2$ from solution. Thus an evaporation technique to recover the carbonate from solution can be avoided.

EXAMPLE 3

Fly Ash Filter Cake Tests

Fly ash obtained from a conventional coal-burning electric utility plant was mixed with excess molten carbonate (equal parts by weight of Li, Na, and K), stirred and filtered through a sintered-metal filter. Inert gas was blown through the cake to displace as much of the molten salt as possible. The cake was cooled, scraped from the filter, and ground until it would pass through a 50-mesh U.S. standard sieve screen. The powdered filter cake contained 65.5% $(K, Li, Na)_2CO_3$, 33.3% fly ash and 1.2% water before drying. At the same time a control run was made using fly ash without any added carbonate to evaluate possible solubility of fly ash components.

The filter cake and fly ash samples were slurried with 4 parts of water at 80°C for 20 minutes. The resultant mixture was filtered. The filtrate, which contained the dissolved potassium carbonate and sodium carbonate, was evaporated to dryness and weighed. The filter cake from this filtration was slurried with two parts of water and carbonated at 10°C under 20 psig $CO_2$ pressure for 30 minutes. The resultant mixture was filtered to recover the insoluble fly ash, which was dried and weighed. The filtrate containing the lithium bicarbonate was decarbonated by evaporating the solution to dryness and weighing the resultant lithium carbonate that was formed.

The recovery of the alkali metal carbonates and fly ash from the fly ash filter cake is summarized in Table 3. As may be noted from the table, substantially all of the sodium and potassium carbonates and more than 85% of the lithium carbonate can be extracted from the fly ash filter cake by the relatively inexpensive and simple process shown.

TABLE 3

Recovery of Alkali Metal Carbonates from Fly Ash Filter Cake

| Run No. | Temp. (°C) | Starting Material | $Na_2CO_3$ & $K_2CO_3$ Recovery Wt.% | $Li_2CO_3$ Recovery Wt.% | Fly Ash Recovery Wt.% | Material Balance % |
|---|---|---|---|---|---|---|
| 1 | Ambient | Cake | 94.1 | 86.1 | 99.3 | 94.1 |
| 2 | 0 | Cake | 102.0 | 87.4 | 103.7 | 99.3 |
| 3 | 0 | Cake | 103.8 | 87.3 | 104.9 | 100.3 |
| 4 | 0 | Fly ash only | (0.8) | (0.7) | 98.3 | 100.5 |

It will of course be realized that many variations in reaction conditions may be used in the practice of this invention, depending in part upon the amount of fly ash initially removed by the electrostatic precipitators from the flue gas stream, as well as the absorptive nature of the fly ash and coke utilized in the sulfur oxide removal process. Also, while the filter cakes may be dispersed in varying amounts of water, to give relatively thin, dilute slurries for ease in filtration, this will result in lower ultimate recovery of lithium carbonate as well as requiring increased vessel capacity for handling the extra amounts of water involved. Thus it is generally preferable to use minimal amounts of water in preparing slurries of a thickness consistent with fluidity, filtration, and solubility requirements.

While certain exemplary reactions have been described for the carbonation and decarbonation steps, the actual mechanism of reaction will vary depending upon the reaction temperatures and pressures employed during both the carbonation and aeration steps. Also, there may be employed a batch process or continuous process, preferably the latter, with the usual provision for recycle of various unreacted or partially reacted components. Thus even where the desired reactions do not go to completion, unreacted or undesired products may be recycled in the process without substantial interference with the basic steps of carbonation and decarbonation. Also, while separate filters and vessels have been shown for clarity in describing the various steps of the process, under actual operating conditions the same filters and vessels may be utilized in the practice of various steps of the process of this invention. Also, under actual operating conditions where continuous operation is desired, redundant filters and vessels will be present so that the process is operated continuously while filter cakes and precipitates are removed from one set of filters and while solutions are dispersed in another set of wash vessels. Thus, while the specific examples illustrating this invention as well as the general description of the process have been described with respect to specific concentrations, times, temperatures and other reaction conditions, the invention may be otherwise practiced as will be readily apparent to those skilled in this art. Accordingly, this invention is not to be limited by the illustrative and specific embodiments thereof, but its scope should be determined in accordance with the claims thereof.

We claim:

1. A process for recovering lithium carbonate from a filter cake containing alkali metal carbonates in admixture with fly-ash-containing particulate matter, said filter cake being obtained from a closed-cycle process for the removal of sulfur oxides from a fly-ash-containing flue gas, said closed-cycle process including stages of absorption and reduction, and where, in the absorption stage said flue gas is contacted with a molten salt mixture containing the carbonates of sodium, potassium, and lithium as the active absorbent for said sulfur oxides to convert a portion of the molten absorbent to alkali metal sulfites and sulfates, and where a porous filter cake of fly ash which contains carbonate melt is obtained by filtration of the melt downstream from said absorption stage, and where, in the reduction stage the converted absorbent in the melt is reduced to alkali metal sulfides by contact with a carbonaceous reducing agent, and where a porous filter cake of the carbonaceous material which contains carbonate melt is obtained by filtration of the melt downstream from said reduction step, the improvement providing economic recovery from said filter cakes of the carbonate-containing melt therein for reuse in said closed-cycle process which comprises the sequential steps of:

forming an aqueous slurry of the fly ash and carbonaceous filter cakes, filtering said slurry to remove in said filtrate the dissolved sodium carbonate and potassium carbonate components of the melt and the dissolved water-soluble components of the filter cakes and recover a second filter cake containing the lithium carbonate component of the melt and the water-insoluble components of said fly ash and carbonaceous filter cakes, forming a second aqueous slurry from said second filter cake, carbonating said second slurry to convert the insoluble lithium carbonate therein to soluble lithium bicarbonate in aqueous solution, filtering the solution to recover in the filtrate the dissolved lithium bicarbonate, decarbonating the lithium bicarbonate solution to precipitate lithium carbonate in the aqueous medium and filtering said aqueous medium to separately recover the lithium carbonate therefrom for recycle in the process.

2. The process according to claim 1 wherein the carbonation is performed at a temperature between 0° and 10°C at a pressure between 10 and 30 psig of $CO_2$, and the decarbonation is performed by bubbling air through the solution.

3. The process according to claim 1 wherein the filtrate from the last filtration step is combined with the second aqueous slurry for carbonation therewith.

* * * * *